Patented Feb. 8, 1927.

1,617,206

UNITED STATES PATENT OFFICE.

ALEXANDER L. FEILD, OF NEW YORK, N. Y., ASSIGNOR TO ELECTRO METALLURGICAL COMPANY, A CORPORATION OF WEST VIRGINIA.

PROCESS OF RECOVERING METALS FROM LIQUIDS AND COMPOSITIONS THEREFOR.

No Drawing.  Application filed June 20, 1922. Serial No. 569,718.

This invention relates to the separation of metals from liquids containing them in solution or suspension. More particularly, the invention provides an improved process, comprising the use of activated carbon, for recovering precious metals from solutions of their salts.

It is well known that ordinary charcoal is somewhat effective as an agent for removing certain metal ions from solution. This fact has been applied in a process for the recovery of gold, comprising passing the cyanid solution of the metal through extractors containing granular charcoal, removing the gold-bearing charcoal, and smelting for the recovery of the gold with additions adapted to flux the ash of the charcoal. This procedure, however, is not well adapted from either the standpoint of efficient metal removal or of economical operation, for plants handling any considerable volume of solution, because of the low efficiency of the carbonaceous metal-removing agent in the physical condition in which it has heretofore been used. Even where the solution is passed through extensive extraction systems into contact with a large bulk of charcoal, it has been found in practice that the recovery of the metal values is incomplete.

In accordance with the present invention, these and other disadvantages of prior processes are eliminated by the adoption of a carbonaceous treating agent having an efficiency much greater than that of the charcoal previously used in metal-recovery processes. I have discovered that activated carbon is characterized by the ability to remove precious metals from liquids with a very high degree of efficiency. Relatively small amounts of such carbon, as compared with the amounts of unactivated charcoal heretofore necessary, suffice for substantially complete removal of the metal from solution.

Activated carbon for use in the process of the present invention may be prepared according to the disclosure in the application for United States patent filed by N. K Chaney on June 30, 1919, Serial No. 307,620, now Patent 1,497,543, or by any other method resulting in a product having the requisite degree of activity. It should be stated here that the activity of carbon may be designated by its "iodin number", which is determinable in the following manner:

The iodine adsorption value of carbon is obtained by determining the amount of iodin which the carbon will adsorb from a .2N iodine potassium iodide solution, which contains three times as much potassium iodide as iodin. 1 gram of carbon which has been pulverized to pass 200 mesh and dried is placed in 50 cc. of the iodin solution. The mixture is agitated at room temperature for 3 minutes and then filtered through a dry filter paper. The first runnings are discarded since filter paper has a slight adsorptive effect for iodin. The concentration of iodin in the remaining filtrate is determined by titration. The percentage of iodin removed from the solution under these conditions is a measure of the activity of the carbon. Highly active carbons will in this test remove around 90% of the iodin. The "iodin number" is the percentage of iodin removed.

Other methods of determining and designating degrees of activity are available, but reference to the iodin number will be sufficient herein, it being understood that the figures given represent an active condition which is expressible in various terms and that the metal-removing capacity is in general proportionate to the activity as indicated by the iodin number. For the purposes of this invention, carbon having an iodin number of about 65–75% is preferred. More active carbon may of course be used, but does not in general give sufficient improvement in metal recovery to justify the increased cost of its preparation. Carbon having an iodin number of less than 20% is comparable in its effect to the unactivated carbon heretofore employed, and is not suitable for use in the present process.

For recovering precious metals from certain types of solution, for example, cyanid solutions, it is advantageous to form the activated carbon into coherent cakes or blocks. This may be done in any way which does not substantially impair the activity of the carbon. For example, a carbonaceous binder may be used to bond the particles of activated carbon, as disclosed in the application of A. B. Ray, Serial No. 511,170, filed October 28, 1921.

The cyanid solution is passed through a suitable thickness of such bonded carbon, and as the latter approaches its maximum absorption of precious metal, it is removed and replaced by fresh carbon. The metal-carrying carbon is then dried and burned, a suitable material being added for fluxing the ash. For the purposes of the present invention, a fluxing material, such as calcium fluorid, or other flux insoluble in the solution to be treated, may be incorporated in the carbon mass. The amount and kind of flux will be adjusted in accordance with the ash content of the activated carbon, and with the conditions of operation. The process is considerably facilitated by the use of the flux-containing carbon blocks, as they may be smelted directly for the recovery of the metal without the necessity of adding a calculated amount of flux. In some cases the combustion of the carbon in the filter blocks will alone produce sufficient heat; if not, additional fuel will of course be used.

The solution may be treated in other ways than that just described, for example, by filtration through the carbon in unagglomerated masses, or by agitation with the activated carbon in granular condition, followed by filtration to remove the carbon-bearing metal, together with any metal which may have been precipitated without adherence to the carbon.

The high efficiency of activated carbon, as compared with ordinary charcoal, is well illustrated by the removal of gold from a solution of gold trichlorid. When the solution, containing 0.43 grams of gold per 100 cc., was treated with activated carbon having an activity, as indicated by the iodin number, of 68%, the following results were obtained:

| Relative weights of C (activated) and Au. | % Au removed. |
|---|---|
| 0.77 C : 1.0 Au | 70 |
| 1.53 C : 1.0 Au | 88 |
| 2.30 C : 1.0 Au | 100 |

Another sample of the solution was treated under the same conditions with unactivated carbon in the form of a good grade of charcoal, with the following results:

| Relative weights of C (unactivated) and Au. | % Au removed. |
|---|---|
| 2.30 C : 1.0 Au | 55 |
| 4.62 C : 1.0 Au | 75 |
| 9.23 C : 1.0 Au | 88 |
| 13.84 C : 1.0 Au | 100 |

From this result it will be seen that activated carbon is about six times as effective as charcoal in the removal of gold from solution.

The advantages of activated carbon as an agent in metal-recovery are still more striking where silver is the precious metal to be removed. The ordinary charcoal process is not in general applicable in the treatment of solutions of silver, as that metal is not effectively removed by unactivated charcoal. I have discovered, however, that activated carbon is well adapted for use in silver recovery.

Although particular reference has been made to the recovery of precious metals from aqueous solutions of their salts, it is to be understood that the application of the invention is not limited to such metals or solutions. The invention is based upon the discovery that activated carbon is characterized by the ability to precipitate, adsorb, or otherwise remove metals from solution or suspension in liquids, with an efficiency much greater than that of unactivated carbon, and this discovery broadly is included within the scope of the appended claims.

I claim:—

1. Process of removing metal from a liquid containing the same, comprising bringing the liquid into intimate contact with activated carbon having an iodin adsorptivity, measured under the hereindescribed test conditions, in excess of 20%.

2. Process of recovering a metal from a solution containing the same, comprising bringing the solution into intimate contact with activated carbon having an iodin adsorptivity, measured under the hereindescribed test conditions, in excess of 20%, filtering the solution, and treating the solid residue for the separation of the metal contained therein.

3. Process of recovering a precious metal from a solution containing the same, comprising bringing the solution into intimate contact with activated carbon having an iodin adsorptivity, measured under the hereindescribed test conditions, in excess of 20%, separating the carbon, and smelting the carbon to recover the precious metal carried thereby.

4. Process of recovering gold from a cyanid solution, comprising bringing the solution into intimate contact with activated carbon having an iodin adsorptivity, measured under the hereindescribed test conditions, in excess of 20%, separating the carbon, and smelting the carbon with a suitable flux to recover the gold carried thereby.

5. The invention according to claim 4, in which the activated carbon is formed into blocks and the solution is passed therethrough.

6. A composition for use in the recovery of metals from liquids containing the same, comprising activated carbon having an iodin adsorptivity, measured under the hereindescribed test conditions, in excess of 20% associated with a material adapted to flux the ash content of said carbon.

7. A filter block for use in the recovery of metals from liquids containing the same, comprising bonded activated carbon having an iodin adsorptivity, measured under the hereindescribed test conditions, in excess of 20% associated with a material adapted to flux the ash content of said carbon.

In testimony whereof, I affix my signature.

ALEXANDER L. FEILD.